(12) United States Patent
Clemmensen et al.

(10) Patent No.: US 11,468,058 B1
(45) Date of Patent: Oct. 11, 2022

(54) SCHEMA AGGREGATING AND QUERYING SYSTEM

(71) Applicant: Siteimprove A/S, Copenhagen (DK)

(72) Inventors: Asbjørn Clemmensen, Copenhagen (DK); Morten Eskesen, Copenhagen (DK); Morten Fjord-Larsen, Frederiksberg (DK)

(73) Assignee: Siteimprove A/S, Copenhagen (DK)

( * ) Notice: Subject to any disclaimer, the term of this patent is extended or adjusted under 35 U.S.C. 154(b) by 0 days.

(21) Appl. No.: 17/590,579

(22) Filed: Feb. 1, 2022

Related U.S. Application Data

(60) Provisional application No. 63/278,709, filed on Nov. 12, 2021.

(51) Int. Cl.
  *G06F 16/2453* (2019.01)
  *G06F 16/21* (2019.01)
  *G06F 21/62* (2013.01)

(52) U.S. Cl.
  CPC ...... *G06F 16/24535* (2019.01); *G06F 16/213* (2019.01); *G06F 21/6218* (2013.01); *G06F 2221/2141* (2013.01)

(58) Field of Classification Search
  CPC ............. G06F 16/24535; G06F 16/213; G06F 21/6218; G06F 2221/2141
  USPC ......................................................... 707/803
  See application file for complete search history.

(56) References Cited

U.S. PATENT DOCUMENTS

| | | | |
|---|---|---|---|
| 836,414 | A | 11/1906 | Toles |
| 6,360,235 | B1 | 3/2002 | Tilt |
| 7,231,606 | B2 | 6/2007 | Miller et al. |
| 7,475,067 | B2 | 1/2009 | Clary et al. |
| 7,558,795 | B2 | 7/2009 | Malik et al. |
| 7,584,435 | B2 | 9/2009 | Bailey et al. |
| 7,797,200 | B2 | 9/2010 | Patrawala |
| 7,805,428 | B2 | 9/2010 | Batista Reyes et al. |
| 8,065,410 | B1 | 11/2011 | Breen et al. |
| 8,196,104 | B2 | 6/2012 | Cohrs et al. |

(Continued)

FOREIGN PATENT DOCUMENTS

| | | |
|---|---|---|
| WO | WO 2012/027022 | 3/2012 |

OTHER PUBLICATIONS

EP Supplementary Search Report in European Application No. EP18853482, dated Mar. 29, 2020, 9 pages.

(Continued)

*Primary Examiner* — Joshua Bullock

(74) *Attorney, Agent, or Firm* — Fish & Richardson P.C.

(57) ABSTRACT

In general, the subject matter described in this disclosure can be embodied in methods and systems for using a composite schema to answer a query. A computing system receives a data query, and combines a first schema provided by a first querying system with a second schema provided by a second querying system to form a composite schema. The computing system executes the data query using the composite schema in order to determine which selected one or more querying systems from a set of querying systems to query in response to receiving the data query. The computing system sends, to the requesting computing device responsive to receiving the data query from the requesting computing device, a response to the query, the response to the query being based on information received from the selected one or more data querying systems.

15 Claims, 11 Drawing Sheets

(56) References Cited

U.S. PATENT DOCUMENTS

| | | | |
|---|---|---|---|
| 8,447,751 B2 | 5/2013 | Stouffer et al. | |
| 8,533,684 B2 | 9/2013 | Brunet et al. | |
| 8,554,698 B2 | 10/2013 | Bando et al. | |
| 8,613,039 B2 | 12/2013 | Chen et al. | |
| 8,805,971 B1* | 8/2014 | Roth | G06F 9/5072 709/220 |
| 8,972,379 B1 | 3/2015 | Grieselhuber et al. | |
| 9,009,784 B2 | 4/2015 | Chen et al. | |
| 9,087,035 B1 | 7/2015 | Bandaru et al. | |
| 9,152,729 B2 | 10/2015 | Ajoku et al. | |
| 9,537,732 B2 | 1/2017 | Mukherjee et al. | |
| 9,563,422 B2 | 2/2017 | Cragun et al. | |
| 10,114,902 B2 | 10/2018 | Byakod et al. | |
| 10,169,188 B2 | 1/2019 | Belekar et al. | |
| 10,534,512 B2 | 1/2020 | Jadhav et al. | |
| 10,706,122 B2 | 7/2020 | Sabbavarpu | |
| 10,831,831 B2 | 11/2020 | Greene | |
| 10,860,594 B2 | 12/2020 | Jamshidi | |
| 10,963,470 B2 | 3/2021 | Jamshidi | |
| 10,970,294 B2 | 4/2021 | Jamshidi | |
| 11,113,276 B2 | 9/2021 | Zhao | |
| 11,262,979 B2 | 3/2022 | Deshmukh et al. | |
| 11,334,793 B2* | 5/2022 | Jacob | G06F 21/6227 |
| 2004/0039734 A1 | 2/2004 | Judd et al. | |
| 2006/0253345 A1 | 11/2006 | Herber | |
| 2008/0133500 A1 | 6/2008 | Edwards | |
| 2009/0113287 A1 | 4/2009 | Yee | |
| 2010/0042608 A1 | 2/2010 | Kane | |
| 2012/0010927 A1 | 1/2012 | Attenberg et al. | |
| 2012/0017281 A1 | 1/2012 | Bannerjee et al. | |
| 2012/0047120 A1 | 2/2012 | Connolly | |
| 2012/0185464 A1* | 7/2012 | Kuroda | G06F 16/254 707/E17.014 |
| 2012/0254405 A1 | 10/2012 | Ganesh et al. | |
| 2012/0254723 A1 | 10/2012 | Kasa et al. | |
| 2013/0282691 A1 | 10/2013 | Stouffer et al. | |
| 2014/0164345 A1 | 6/2014 | Connolly et al. | |
| 2014/0304578 A1 | 10/2014 | Parkinson et al. | |
| 2015/0039746 A1 | 2/2015 | Mukherjee et al. | |
| 2015/0317132 A1 | 11/2015 | Rempell et al. | |
| 2015/0348071 A1 | 12/2015 | Cochrane et al. | |
| 2016/0055490 A1 | 2/2016 | Keren et al. | |
| 2016/0210360 A9 | 7/2016 | Stouffer et al. | |
| 2016/0353148 A1 | 12/2016 | Prins et al. | |
| 2018/0075095 A1* | 3/2018 | Srivastava | G06F 16/2358 |
| 2018/0210965 A1 | 7/2018 | Grigoryan et al. | |
| 2019/0073365 A1 | 3/2019 | Jamshidi | |
| 2020/0004730 A1* | 1/2020 | Brown | G06F 16/248 |
| 2020/0151187 A1 | 5/2020 | Jamshidi | |
| 2020/0394200 A1 | 12/2020 | Jamshidi | |
| 2021/0326348 A1 | 10/2021 | Jamshidi | |
| 2021/0409192 A1* | 12/2021 | Gollogly | H04L 63/0807 |

OTHER PUBLICATIONS

Gustafsdottir [online], "CMS Plugin: Frequently Asked Questions," Siteimprove.com, Jul. 9, 2020, 3 pages.
Gustafsdottir [online], "How to navigate the Siteimprove CMS Plugin," Siteimprove.com, Sep. 10, 2020, 7 pages.
International Preliminary Report on Patentability in PCT Appln. No. PCT/US2018/049809, dated Mar. 10, 2020, 13 pages.
International Search Report and Written Opinion in Application No. PCT/US2018/049809, dated Nov. 19, 2018, 13 pages.
Kamal, "Evaluating web accessibility metrics for Jordanian Universities," International Journal of Advanced Computer Science and Applications, 2016, 7(7):113-122.
Needham [online], "CMS Plugin: Security FAQ," Siteimprove.com, Aug. 9, 2020, 2 pages.
Needham [online], "On which CMS is the Siteimprove plugin available?," Siteimprove.com, May 7, 2020, 11 pages.
Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.
Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.
Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.
Siteimprove.com [online], "Adobe Experience Manager: Siteimprove provided plugin," available on or before Aug. 12, 2020, via Internet Archive: Wayback Machine URL <https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.
Siteimprove.com [online], "Adobe Experience Manager: Siteimprove provided plugin," available on or before Sep. 20, 2020, via Internet Archive: Wayback Machine URL <https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.
Siteimprove.com [online], "Aug. & Sep. 2021 Release Highlights," Oct. 8, 2021, retrieved on Mar. 21, 2022, retrieved from URL<https://help.siteimprove.com/support/solutions/articles/80000946947-august-september-2021-release-highlights>, 2 pages.
Siteimprove.com [online], "Drupal," available on or before Aug. 12, 2020, via Internet Archive: Wayback Machine URL <https://web.archive.org/web/20200812071254/https:/siteimprove.com/en/core-platform/integrations/cms-plugin/drupal/>, retrieved on Mar. 21, 2022, URL<https://siteimprove.com/en/core-platform/integrations/cms-plugin/drupal/>, 12 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866#h_01F0GCPTWX5H3ZS558V1GVEQQN>, 3 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.
Siteimprove.com [online], "Jan. 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.
Siteimprove.com [online], "Jul. 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.
Siteimprove.com [online], "Oct. & Nov. 2021 Release Highlights," Dec. 7, 2021, retrieved on Mar. 21, 2022, retrieved from URL<https://help.siteimprove.com/support/solutions/articles/80000958280-october-november-2021-release-highlights>, 3 pages.
Siteimprove.com [online], "Oct. 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.
Siteimprove.com [online], "Optimizely + Siteimprove," available on or before Jun. 16, 2021, via Internet Archive: Wayback Machine URL <https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.
Siteimprove.com [online], "Siteimprove CMS Plugin Integration Cookbook," available on or before Aug. 5, 2020, via Internet Archive: Wayback Machine URL <https://web.archive.org/web/20200805195514/https://developer.siteimprove.com/cms-plugin-integration-cookbook/>, retrieved on Mar. 21, 2022, URL<https://developer.siteimprove.com/cms-plugin-integration-cookbook/>, 13 pages.
Siteimprove.com [online], "Web accessibility for all with the next generation of Siteimprove Accessibility," Mar. 20, 2020, retrieved

(56) References Cited

OTHER PUBLICATIONS on Mar. 21, 2022, retrieved from URL<https://siteimprove.com/en-us/blog/web-accessibility-for-all-with-next-generation-siteimprove-accessibility/>, 36 pages.

Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.

Zhou, "Evaluating Websites Using a Practical Quality Model", Software Technology Research Laboratory, De Montfort University, 2009, 113 pages.

\* cited by examiner

FIG. 4A

470 Combine first schema from first querying system with second schema from second querying system to form composite schema

472 Composite schema formed responsive to receiving the data query

474 Composite schema includes:

(1) First entity types defined by the first schema and not the second schema;

(2) Second entity types defined by the second schema and not the first schema; and (3) Common entity types defined by both the first schema and the second schema

480 Execute the data query using the composite schema

FIG. 5 482 Determine which selected one or more querying systems to send subqueries

484 Aggregate one or more responses to subqueries

490 Send response to the query to the requesting computing device

FIG. 4B

Different composite schemas for different user accounts

Different composite schemas for same user account due to an updated schema

SCHEMA AGGREGATING AND QUERYING SYSTEM

REFERENCE TO CO-PENDING APPLICATION

This application claims the benefit of priority under 35 U.S.C. § 119(e) to U.S. Provisional Patent Application No. 63/278,709, filed Nov. 12, 2021 and entitled SCHEMA AGGREGATING AND QUERYING SYSTEM, and the entire disclosure set forth therein is incorporated herein by reference.

TECHNICAL FIELD

This document generally relates to schema aggregation and querying.

BACKGROUND

Computer systems often store data in a manner in that models real-world entities. A certain portion of data may represent a real-world entity, and that portion of data may also describe characteristics of the real-world entity. For example, a portion of data that represents a city may include data that describes characteristics of the city, such as population, geographical location, mayor name, and time zone. There may be many such portions of data that represent various different cities. Each portion of data that represents a city may be structured in a similar manner, with each storing information for the same set of characteristics, or at least being configured to store information for the same set of characteristics.

Each such portion of data may also include references to other entities, for example, each portion of data that represents a city may include a reference to a country in which the city exists. The reference to the country may not simply be text that provides a name of the country, but a reference to a separate portion of data that represents the country. The portion of data that represents the country may itself include data that describes characteristics of the country, such as population, president, gross domestic product, and year of founding. There may be many such portions of data representing different countries, each having data that provides the characteristics of the country (or at least being capable of storing such data).

Storing data in this manner provides computational efficiencies. Rather than each portion of data for a city having to store information that indicates the president of the country in which the city exists and the gross domestic product of that country, each such portion of data that represents a city can simply include a reference to the portion of data that represents the country. This saves memory and provides data integrity because data that describes characteristics of the country may only need to be updated a single time to change a particular characteristic, rather than updating such data for each city.

A system can include such portions of data for many different types of entities, with potentially hundreds of instances of each type of entity, all having relationships to various other entities of different types. Each type of entity, however, may only be able to include data that describes a pre-defined set of characteristics and relationships. For example, a pre-defined relationship for a city may be a "country in which the city exists" relationship, with the pre-defined relationship having a relationship type of "country". As such, the system may not permit this relationship field to be filled with information that indicates an entity of type "mayor". Moreover, the system may not permit addition to a specific country entity of a relationship type that is not pre-defined, such as a relationship to a "vegetable" type of entity.

A set of data that defines multiple permissible types of entities in a storage system, the pre-defined permissible characteristics for each type of entity, and the pre-defined permissible relationships for each type of entity may be called a "schema". This schema defines how a storage system may be populated with different conceptual entities and their relations to each other. As such, a schema constrains the structure of the data in the storage system. The actual structure, however, is defined by the data in the storage system. While a schema may define a "city" type of entity and a "country" type of entity, the number of cities in a storage system depends on the existence of data defining multiple such cities of the city type. In other words, the schema may define a "city" type of entity, but data may define a city "Copenhagen" of the city type of entity, and a city "Minneapolis" of the city type of entity.

SUMMARY

This document describes techniques, methods, systems, and other mechanisms for performing schema aggregation and querying. In general, the technologies described in this disclosure relate to a composite querying system that is configured to aggregate schemas from multiple different querying systems, and that can receive and process a single query that is in accordance with the aggregated schema and that none of the multiple different querying systems would otherwise be able to process.

As additional description to the embodiments described below, the present disclosure describes the following embodiments.

Embodiment 1 is a computer-implemented method, comprising: receiving, by a computing system, a data query from a requesting computing device, the requesting computing device having provided to the computing system credentials for a particular user account in association with submission of the data query to the computing system, the computing system configured to request data from a set of querying systems that includes a first querying system and a second querying system; combining, by the computing system, a first schema that was provided by the first querying system and that defines a first collection of entity types queryable using the first querying system with a second schema that was provided by the second querying system and that defines a second collection of entity types queryable using the second querying system to form a composite schema that includes: (i) first entity types that are from the first collection of entity types and that are defined by the first schema and not the second schema, the first entity types referencing the first querying system as being configured to provide data regarding the first entity types; (ii) second entity types that are from the second collection of entity types and that are defined by the second schema and not the first schema, the second entity types referencing the second querying system as being configured to provide data regarding the second entity types; and (iii) common entity types that are from both the first collection of entity types and the second collection of entity types and that are defined by both the first schema and the second schema, the common entity types referencing both the first querying system and the second querying system as being configured to provide data regarding the common entity types; executing, by the computing system, the data query using the composite schema in order to determine which selected one or more querying systems in the set of querying systems to query in response to receiving the data query; and sending, by the computing system to the requesting computing device responsive to receiving the data query from the requesting computing device, a response to the query, the response to the query being based on information received from the selected one or more data querying systems.

Embodiment 2 is the computer-implemented method of embodiment 1, wherein the computing system combines the first schema and the second schema to form the composite schema responsive to the computing system receiving the data query.

Embodiment 3 is the computer-implemented method of any one of embodiments 1-2, comprising: identifying, by the computing system, the set of querying systems as being a subset of querying system to which the particular user account has authorization to access from among a collection of querying systems, such that the particular user account does not have authorization to access at least one querying system from the collection of querying systems.

Embodiment 4 is the computer-implemented method of embodiment 3, comprising: receiving, by the computing system, a second data query from a second requesting computing device, the second requesting computing device having provided to the computing system credentials for a second user account in association with submission of the second data query to the computing system; identifying, by the computing system, that the second user account has authorization to access a second set of computing systems from among the collection of querying systems, the second set of querying systems including the first querying system and a third querying system but excluding the second querying system, wherein the first set of querying systems to which the first user account has authorization to access excludes the third querying system; combining, by the computing system, the first schema with a third schema that was provided by the third querying system and that defines a third collection of entity types queryable using the third querying system to form a second composite schema that includes: (i) second-first entity types that are from the first collection of entity types and that are defined by the first schema and not the third schema, the second-first entity types referencing the first querying system as being a resource to provide data regarding the second-first entity types; (ii) third entity types that are from the third collection of entity types and that are defined by the third schema and not the first schema, the third entity types referencing the third querying system as being a resource to provide data regarding the third entity types; and (iii) second-common entity types that are from both the first collection of entity types and the third collection of entity types and that are defined by both the first schema and the third schema, the second-common entity types referencing both the first querying system and the third querying system as being resources to provide data regarding the second-common entity types, wherein the composite schema excludes entity types that are defined by the third schema and not the first schema and not the second schema, wherein the second composite schema excludes entity types that are defined by the second schema and not the first schema and not the third schema; executing, by the computing system, the second data query using the second composite schema in order to determine which second-selected one or more data querying systems in the second set of querying system to employ in responding to the second data query; and sending, by the computing system to the second requesting computing device responsive to having received the second data query from the second requesting computing device, a second response to the second query, the second response to the second query being based on information received from the second-selected one or more data querying systems.

Embodiment 5 is the computer-implemented method of any one of embodiments 1-4, comprising: receiving, by the computing system, a second data query from the requesting computing device, after the second querying system has updated from the second schema to an updated second schema that defines an updated second collection of entity types queryable using the second querying system, the updated second collection of entity types being different from the second collection of entity types; combining, by the computing system, the first schema that was provided by the first querying system with the updated second schema that was provided by the second querying system form an updated composite schema that includes: (i) second-first entity types that are from among the first collection of entity types and that are defined by the first schema and not the updated second schema, the second-first entity types referencing the first querying system as a resource to provide data regarding the second-first entity types; (ii) updated second entity types that are from among the second collection of entity types and that are defined by the updated second schema and not the first schema, the updated second entity types referencing the second querying system as a resource to provide data regarding the updated second entity types, wherein the updated second entity types in the updated composite schema includes an entity type defined by the updated second schema and not the second schema; and (iii) updated common entity types that are from both the first collection of entity types and the updated second collection of entity types and that are defined by both the first schema and the updated second schema, the updated common entity types referencing both the first querying system and the second querying system as resources to provide data regarding the updated common entity types, wherein the updated common entity types in the updated composite schema includes an entity type defined by the updated second schema and not the second schema; executing, by the computing system, the second data query using the updated composite schema in order to determine which second-selected one or more data querying systems in the set of querying system to employ in responding to the second data query; and sending, by the computing system to the remote computing device responsive to having received the second data query from the remote computing device, a second response to the second query based on information received from the second-selected one or more data querying systems.

Embodiment 6 is the computer-implemented method of embodiment 5, wherein the second data query is same as the first data query.

Embodiment 7 is the computer-implemented method of any one of embodiments 1-6, wherein: the data query references a first query-referenced entity type, a second query-referenced entity type, and a third query-referenced entity type; determining which selected one or more data querying systems in the set of querying systems to employ in responding to the data query includes determining, by the computing system, whether any one querying system in the set of querying systems is configured to provide data regarding all of the first query-referenced entity type, the second query-referenced entity type, and the third query-referenced entity type; and the method comprises sending, by the computing system, a subquery that references the first query-referenced entity type and the second query-referenced entity type to the first querying system, responsive to determining that the first querying system is configured to provide data regarding both the first query-referenced entity type and the second query-referenced entity type, such that the first querying system is the selected one or more data querying systems.

Embodiment 8 is the computer-implemented method of any one of embodiments 1-7, wherein: the data query references a first query-referenced entity type, a second query-referenced entity type, and a third query-referenced entity type; determining which selected one or more data querying systems in the set of querying systems to employ in responding to the data query includes: determining, by the computing system as a result of a determination regarding whether any one querying system in the set of querying systems is configured to provide data regarding all of the first query-referenced entity type, the second query-referenced entity type, and the third query-referenced entity type, that: (i) no querying system in the set of querying systems is configured to provide data regarding all of the first query-referenced entity type, the second query-referenced entity type, and the third query-referenced entity type; (ii) the first querying system is configured to provide data regarding the first query-referenced entity type and the second entity type but not the third query-referenced entity type, and (iii) the second querying system provides data regarding the second query-referenced entity type and the third query-referenced entity type but not the first query-referenced entity type; determining, by the computing system, whether the first querying system is capable of processing a first sub-query to provide data regarding the first query-referenced entity type and the second query-referenced entity type concurrently with the second querying system processing a second sub-query to provide data regarding the third query-referenced entity type; the method comprises: sending, by the computing system, the first sub-query to the first querying system and the second sub-query to the second querying system concurrently before a response to either such sub-query has been received by the computing system, responsive to determining that the first querying system is capable of processing the first sub-query concurrently with the second querying system processing the second sub-subquery; aggregating, by the computing system, a first response to the first sub-query that is provided by the first querying system with a second response to the second sub-query that is provided by the second querying system, to form a single composite query response, wherein the response to the query that is sent from the computing system to the requesting computing device comprises the composite query response, the response to the query including data regarding the first query-referenced entity type, the second query-referenced entity type, and the third query-referenced entity type despite no querying system in the set of querying systems providing data regarding all such query referenced entity types.

Embodiment 9 is the computer-implemented method of embodiment 8, wherein: the first querying system is configured to retrieve data regarding the first query-referenced entity type from a particular computer address in computer storage; and the second querying system is configured to retrieve data regarding the first query-referenced entity type from the particular computer address in the computer storage.

Embodiment 10 is the computer-implemented method of any one of embodiments 8-9, wherein the computing system is configured, in response to determining that the first querying system is capable of processing the first sub-query concurrently with the second querying system processing the second sub-subquery, to send the first sub-query to the first querying system and wait to send the second sub-query to the second querying system until the computing system has received a response to the first sub-query.

Embodiment 11 is the computer-implemented method of any one of embodiments 1-10, comprising: requesting, by the computing system responsive to receiving the data query, the first schema from the first querying system.

Embodiment 12 is the computer-implemented method of embodiment 11, wherein: the computing system requests the first schema from the first querying system responsive to determining that the computing system has not cached the first schema; and the method comprises determining, by the computing system, that the computing system has cached the second schema in cached storage, and in response accessing the second schema from the cached storage for use in the combining of the first schema and the second schema.

Embodiment 13 is the computer-implemented method of embodiment 12, wherein: the method comprises determining that the second schema stored in the cached storage has not expired; the computing system uses the second schema from the cached storage in response to determining that the second schema from the cached storage has not expired; and the computing system is configured to request the second schema from the second querying system despite the second schema being stored in the cached storage responsive to determining that the second schema has expired.

Embodiment 14 is the computer-implemented method of embodiment 13, wherein: determining whether the second schema stored in the cached storage has expired includes comparing a timestamp stored in association with the second schema stored in the cached storage to a timestamp stored by the second querying system.

Embodiment 15 is directed to a computing system that includes one or more processors; and one or more computer-readable devices having instructions stored thereon, that when executed by the one or more processors, cause the performance of actions according to the method of any one of embodiments 1-14.

Particular implementations can, in certain instances, realize one or more of the following advantages. The system described herein provides a single interface to remote systems, with this single interface being able to receive and process queries that otherwise would have required querying multiple distinct querying systems. Such a system can generate a single schema from multiple different schemas provided by multiple respective querying systems and that otherwise partially overlap. The system can dispatch one or more component queries to the distinct querying systems in a manner that reduces computational burden on the querying systems.

The details of one or more implementations are set forth in the accompanying drawings and the description below. Other features, objects, and advantages will be apparent from the description and drawings, and from the claims.

DESCRIPTION OF DRAWINGS

FIGS. 4A-B show a flowchart of a process in which a computing system responds to a query using a composite schema.

Like reference symbols in the various drawings indicate like elements.

DETAILED DESCRIPTION

This document generally describes technologies that perform schema aggregation and querying.

Figure 1:
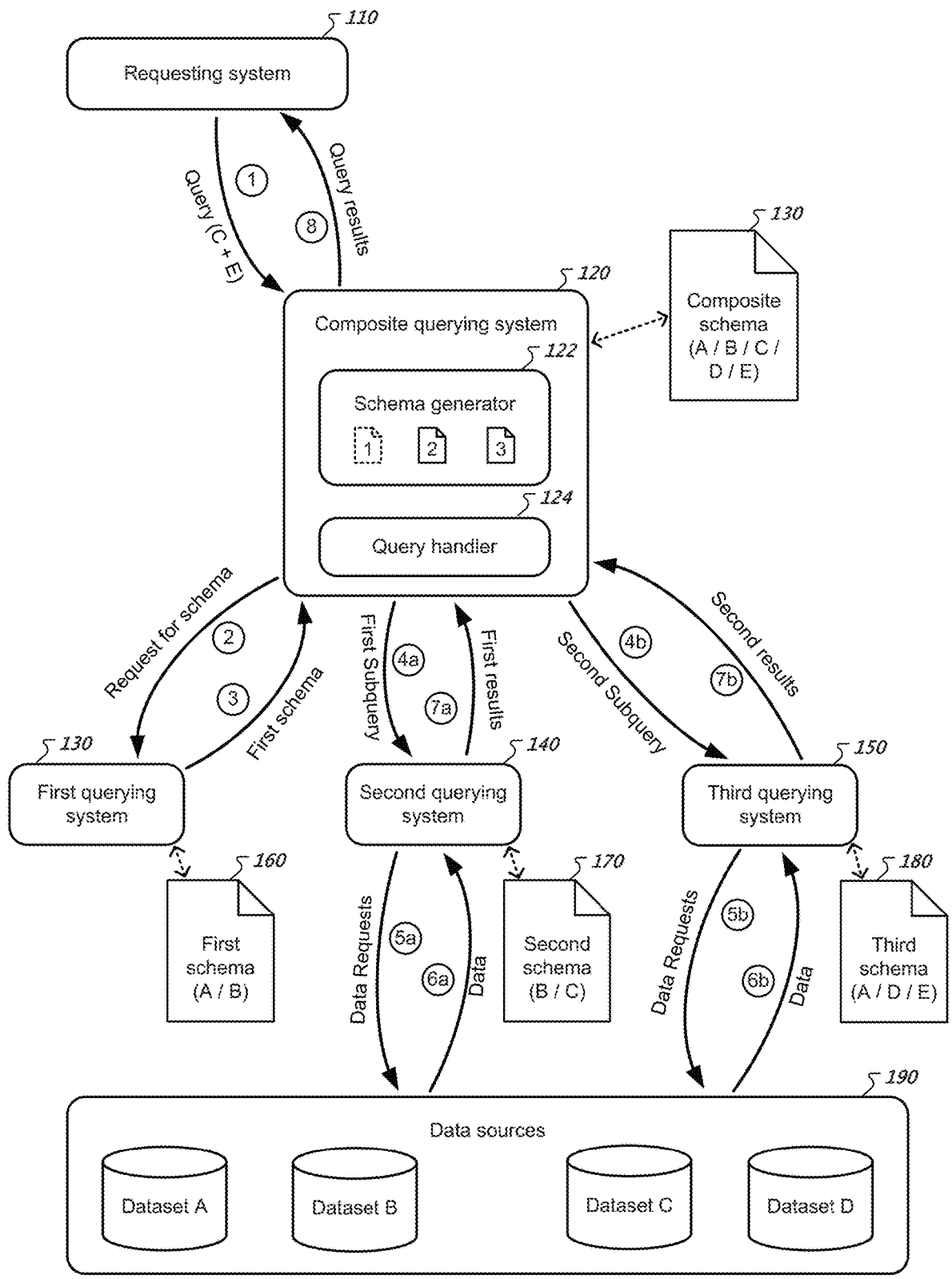
FIG. 1 shows an example system that performs schema aggregation and receives queries in accordance with the aggregated schema.

FIG. 1 shows an example system that performs schema aggregation and receives queries in accordance with the aggregated schema. The system shown in FIG. 1 includes a composite querying system 120 that receives a query from a requesting system 110, generates a composite schema 130 based on multiple schemas 160, 170, and 180 received from multiple corresponding querying systems 130, 140, and 150, and then executes the query by sending subqueries to one or more of the querying systems 130, 140, and 150 (which retrieve data from data sources 190). The below description steps through an example operation of the system.

The requesting system 110 is a computing system that submits a query, as illustrated by stage (1). The structure of the query determine which information to receive from the data sources 190. Different querying systems 130, 140, and 150 provide access to different combinations of data stored in the data sources 190.

In some examples, the querying systems 130, 140, and 150 (and the data sources 190) may be operated by a company that monitors the quality of various different websites for customers, and the querying systems 130, 140, and 150 may provide access to different types of data.

For example, the first querying system 130 may provide access to "accessibility" analyses of various websites, relating to the level of accessibility of website content (e.g., according the Web Content Accessibility Guidelines). A query to the first querying system 130, for example, may be able to specify a certain set of webpages and a certain type of accessibility issue. In response to receiving such a query, the first querying system 130 may access information that it has stored in the data sources 190 and return to a requesting device a list of issues of the specified type and that occur on the specified set of webpages.

The second querying system 140 may provide access to "quality assurance" analyses of various websites, for example, identifying spelling errors and broken links present on various different webpages. The third querying system 150 may provide access to search engine optimization (SEO) analyses of various websites. The system may include additional such querying systems to provide access to different types of website analysis data.

Each of the querying systems 130, 140, and 150 may store a corresponding schema 160, 170, and 180. Each schema may specify a structure of data that the corresponding querying system is able to access. For example, each schema may specify multiple different types of entities, fields capable of being stored for each such type of entity, and relationships capable of being formed between different types of entities.

The earlier portion of this disclosure references an example in which a schema may specify a "city" type of entity and a "country" type of entity. Example types of entities specified by the schemas 160, 170, and 180 include webpages and information related to quality analyses of such webpages. FIGS. 2-3 provide additional detail regarding example schema structures.

While each of the querying systems 130, 140, and 150 is configured to access different types of website analyses data, there are certain entities, fields, and relationships that are referenced in multiple of the corresponding schemas 160, 170, and 180. For example, a "content_page" type of entity may represent a particular webpage. As such, each of the schemas 160, 170, and 180 may reference this type of entity. Each of the schemas 160, 170, and 180 may store different collections of fields for this entity type. For example, a schema for an "accessibility" analyses querying system may define an "image_missing_alt_text_count" field for the "content_page" type of entity, while a schema for a "quality assurance" analyses querying system may define a "broken_links_count" field for the "content_page" type of entity. Without the composite querying system 120, a user or device wishing to submit a query that identifies a list of webpages that include (i) at least one image with missing alt text, and (ii) at least one broken link, would have to query two different querying systems.

The system described herein includes a composite querying system 120 that sits between a requesting system 110 and multiple querying systems 130, 140, and 150, and performs various operations to aggregate multiple schemas 160, 170, and 180 into a single composite schema 130, and to convert a received query into one or more subqueries dispatched to one or more of the multiple querying systems 130, 140, and 150.

As mentioned earlier, the requesting system 110 sends a query to the composite querying system 120, illustrated by Stage (1). The requesting system 110 may be a user device that is capable of receiving user input to define and send queries or may be a device that executes queries in an automated manner as specified by program code.

The composite querying system 120 receives the query from the requesting system 110. The composite querying system 120 includes a schema generator 122 that generates the composite schema 130 from multiple schemas 160, 170, 180, received from multiple respective querying systems 130, 140, and 150.

The file-shaped icons illustrated in FIG. 1 within the schema generator 122 show how, in the illustrated example, the schema generator has cached schemas for the second querying system 140 and the third querying system 150 (illustrated by file-shaped icons in solid lines), but has not cached a schema for the first querying system 130 (illustrated by a file-shaped icon in dotted lines).

As illustrated in Stage (2), in order to obtain a copy of the schema for the first querying system 130, the composite querying system 120 sends a request for a schema to the first querying system 130. The first querying system 130 receives this request and, in response, returns the first schema 160. The first schema 160 defines types of data that are queryable using the first querying system 130, and how to address such information (e.g., that the "broken_links_count" field is a component of the "content_page" type of entity, and not some other type of entity). The first querying system 130 may already have stored the first schema 160, or may generate the first schema 160 responsive to receiving the request for the schema from the composite querying system 120.

At Stage (3), the first querying system 130 sends the first schema to the composite querying system 120. Now that the composite schema generator 122 has access to a schema for each of the querying systems 130, 140, and 150, the composite schema generator 122 generates a composite schema 130 from the component schemas 160, 170, and 180. Generating the composite schema 130 can include building the composite schema 130 by including all entities, fields, and relationships that are defined in the component schemas 160, 170, and 180, and including therewith an indication of the underlying querying system or schema from which the respective type of entity/field/relationship originates.

Some types of entities, fields, and relationships may be defined by more than one of the schemas 160, 170, and 180. In such instances, the schema generator 122 can define, in the composite schema 130, a single instance of the corresponding type of entity/field/relationship, and can include therewith multiple indications of multiple underlying querying systems or schemas from which the type of entity/field/relationship originates.

After the schema generator 122 has generated the composite schema 130, the query handler 124 uses the composite schema 130 to execute the query received by the composite querying system 120 from the requesting system 110. In general, the query handler 124 converts the received query into one or more subqueries, and dispatches the one or more subqueries to one or more of the querying systems 130, 140, and 150.

The query handler 124 includes various heuristics for converting the query it receives into one or more subqueries. The heuristics are described in additional detail with respect to FIG. 5, but generally involve querying as few constituent querying systems as possible, with a preference towards parallel subqueries if possible in distinction to sequential subqueries. The query handler 124 uses the composite schema 130 to validate that the queried data can be accessed by the combination of the querying systems 130, 140, and 150 (e.g., that the query is structured properly), and to determine which of the querying systems 130, 140, and 150 are able to retrieve each type of queried data.

In the example illustrated in FIG. 1, the query received by the composite querying system 120 references the C and E types of entities. Only the second querying system 140 provides access to data regarding instances of entity type C, and only the third querying system 150 provides access to data regarding instances of the entity type E. As a result, the query handler 124 determines to send a first subquery to the second querying system 140 and a second subquery to the third querying system 150, illustrated by Stages (4a) and (4b).

The second querying system 140 and the third querying system 150 receive the subqueries from the composite querying system 120. In some examples, these querying systems use their corresponding schemas to validate that the data specified in each subquery can be accessed using the respective querying system. As illustrated by Stages (5a) and (5b), the second querying system 140 and the third querying system 150 then execute their respective subqueries by sending data requests to the data sources 190.

At Stages (6a) and (6b), the data sources send, to the querying systems 140 and 150, any instances of data that satisfy criteria specified by the corresponding subqueries (e.g., any data regarding entities of the types C and E that satisfy conditions specified by the subqueries).

At Stages (7a) and (7b), the querying systems 140 and 150 return such instances of data to the composite querying system 120.

The composite querying system 120 may process the received instances of data in order to formulate a response to the original query. At Stage (8), the composite querying system 120 sends the final responsive data that it has complied to the requesting system 110 as query results. As such, the composite querying system 120 provides a mechanism to process queries that the querying systems 130, 140, and 150 are individually unable to process.

The querying system selected by the query handler 124 to process information for a particular type of data may change based on the content of a query. For example, both the first schema 160 and the second schema 170 are able to process subqueries that request data on the B type of entity, but the query handler 124 may employ the first querying system 130 to process a query requesting data on the A and B types of entity, while the query handler 124 may employ the second querying system 140 to process a query requesting data on the B and C types of entities.

Figure 2A:
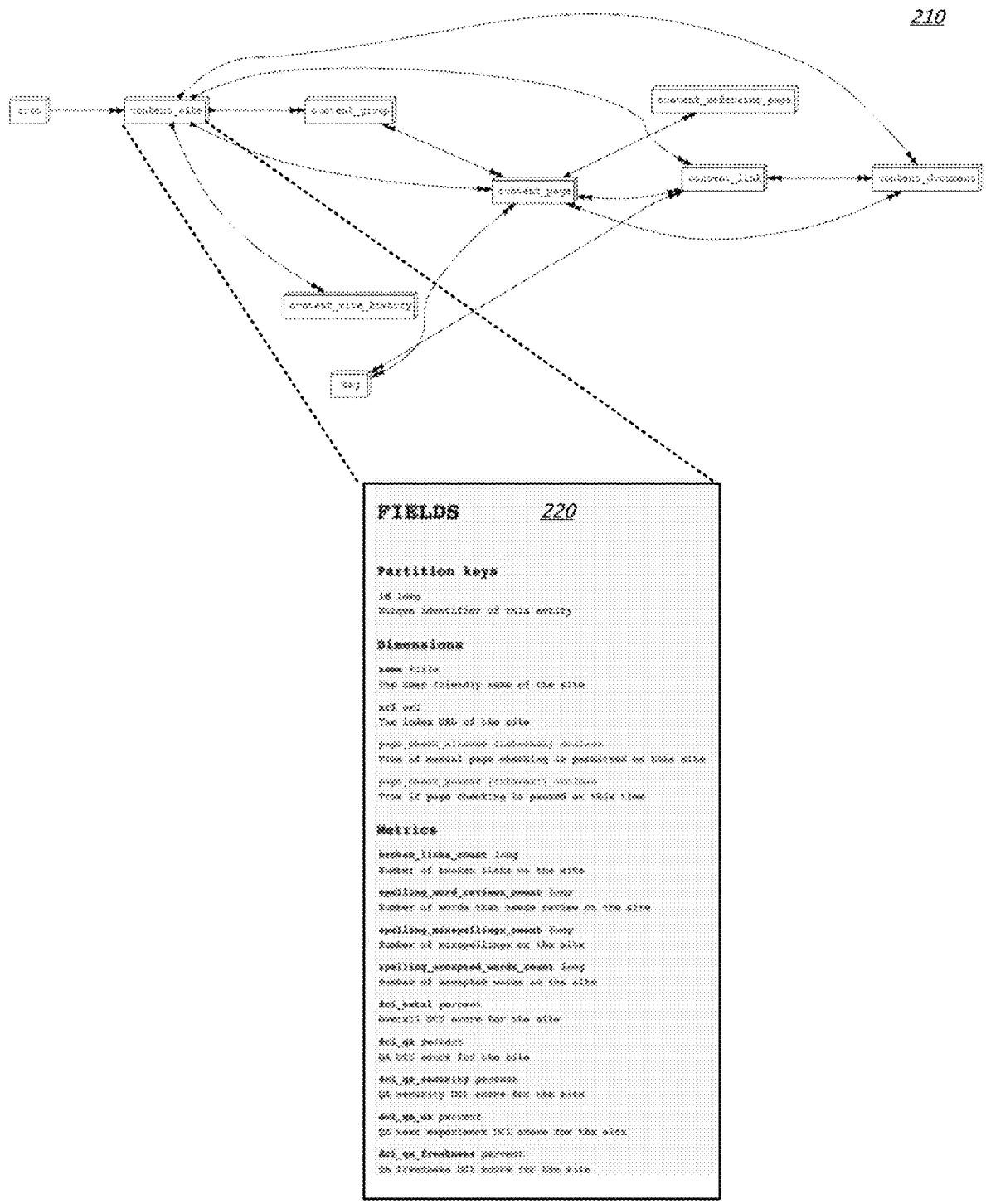
FIG. 2A shows a diagram illustrating entities and relationships of an example schema for a first underlying querying system.

FIG. 2A shows a diagram 210 illustrating entities of an example schema for a first underlying querying system. For example, diagram 210 represents a schema for a "quality assurance" (QA) querying system that is configured to access analysis data formed as a result of many quality assurance analyses of various webpages (such a schema is referred to hereinafter as a QA schema). A first type of entity defined by this QA schema is a content_site type of entity, where portions of data created according to specification of the content_site type of entity can represent different websites.

Defined for the content_site type of entity are relationships to the content_document, content_link, content_group, content_page, and content_site_history types of entities. The content_document type of entity may represent documents that comprise the website. The content_link type of entity may represent links present across any given website. The content_group type of entity may represent a group of webpages within a website. The content_page type of entity may represent individual webpages within a website. And the content_site history may represent a history of content specific to a specific website. Also defined by the QA schema is a content_referring_page type of entity and a tag type of entity.

These various entities have relationships to each other, as illustrated by the arrows in the figure. For example, an instance of the content_site type of entity (e.g., representing the website "example.com") can have relationships to multiple instances of a content_page type of entity (e.g., representing the component webpages that form the website "example.com").

FIG. 2A also shows a box 220 that lists the fields defined for the content_site type of entity, and that the content_site type of entity can include. For example, the content_site type of entity can have a unique identifier, defined by a field titled "id" and stored as a "long" type of data. The URL of the website can be defined by a field titled "url" and stored as a "url" type of data. A number of broken links in the website may be defined by a field titled "broken_links_count" and stored as a long type of data.

As illustrated in diagram 210, the content_site type of entity can have five different types of outgoing relations: the content_document type of entity, the content_link type of entity, the content_group type of entity, the content_page type of entity, and the content_site_history type of entity.

In an example in which instances of data are generated in accordance with this schema data for the website "example.com", the system may store (1) a single instance of the entity type content_site to represent the website "example.com", (2) multiple instances of the entity type content_page to represent the various webpages that make up the website example.com, and (3) multiple instances of the entity type content_link to represent all the links within the webpages of the example.com website. In such an example, the single instance of the content_site entity type for the website example.com may include a pointer or some other type of data that references a computer address for each such referenced instance of data. Should the example.com website include twelve webpages and therefore twelve instances of the entity type content_page, the instance of the entity type content_site for the website example.com may include twelve instances (e.g., pointers) to the twelve respective instances of the entity type content_page.

As illustrated in diagram 210, multiple types of entities reference the content_site type of entity and have potential relationships to a content_site type of entity. For example, each entity of the type content_page may include a relation to a single content_site type of entity, which defines the website to which that webpage belongs.

Figure 2B:
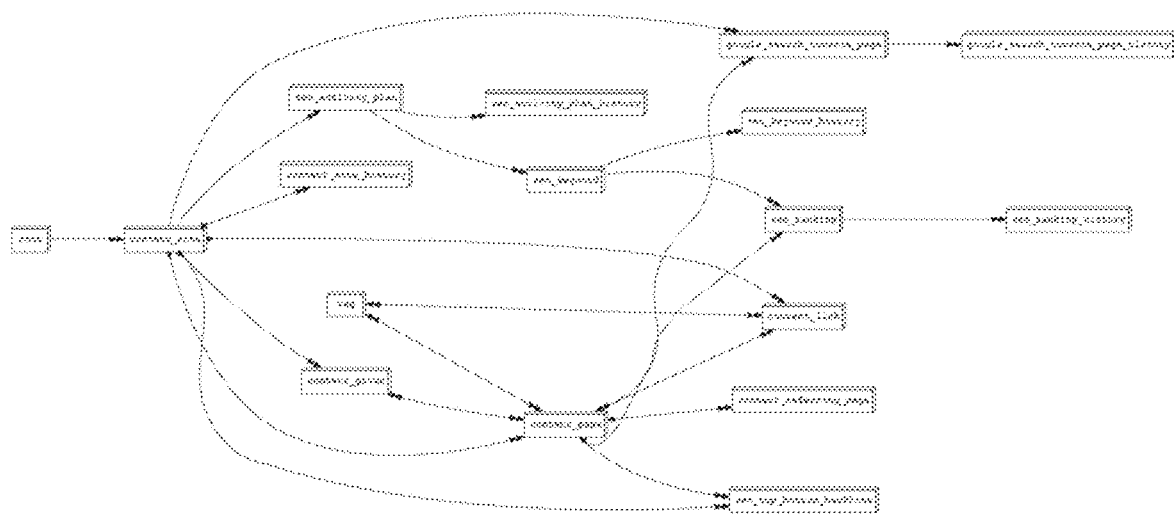
FIG. 2B shows a diagram illustrating entities and relationships of an example schema for a second underlying querying system.

FIG. 2B shows a diagram illustrating entities of a second type of schema for a second underlying querying system. For example, FIG. 2B represents a schema for a "search engine optimization" (SEO) querying system that is configured to access analysis data formed as a result of many SEO analyses of various webpages (such a schema is referred to hereinafter as an SEO schema). A first type of entity defined by this SEO schema is a content_site type of entity, where portions of data created according to specification of the content_site type of entity can represent different websites.

Defined for the content_site type of entity are relationships to the content_link, content_group, content_page, and content_site_history types of entities. The content_link type of entity may represent links present across any given website. The content_group type of entity may represent a group of webpages within a website. The content_page type of entity may represent individual webpages within a website. And the content_site history may represent a history of content specific to a specific website. Also defined by the SEO schema is a content_referring_page type of entity and a tag type of entity. These types of entity are common to the QA schema and the SEO schema.

Types of entities unique to the SEO schema include the seo_activity plan type of entity, the seo_activity_plan_history type of entity, the seo_keyword type of entity, the seo_keyword history type of entity, the seo_ranking type of entity, the seo_ranking_history type of entity, the google_search_console_page type of entity, and the seo_top_bottom_backlink type of entity. A type of entity unique to the QA schema (see FIG. 2A) is the content_document type of entity.

Figure 2C:
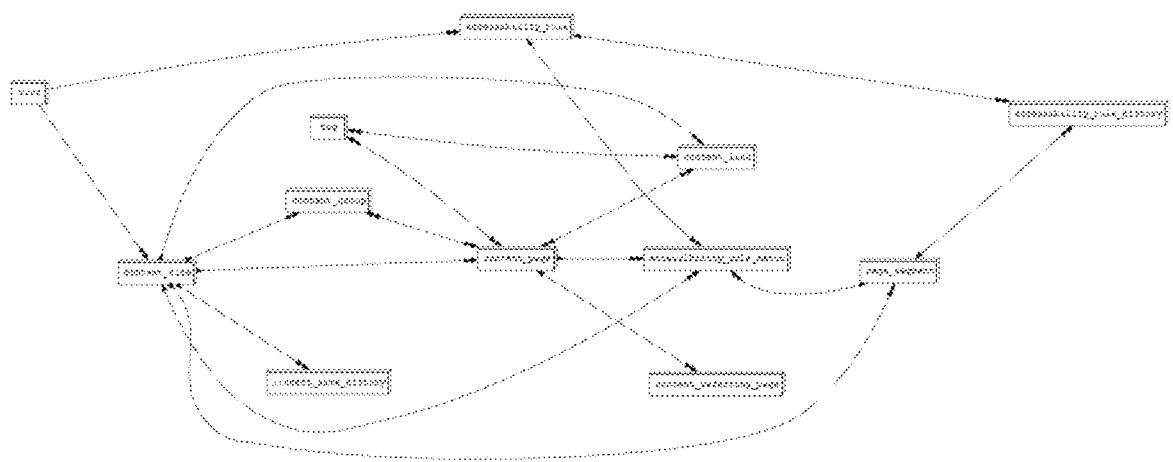
FIG. 2C shows a diagram illustrating entities and relationships of a third example schema for a third underlying querying system.

FIG. 2C shows a diagram illustrating entities of a third example schema for a third underlying querying system. For example, FIG. 2C represents a schema for an "accessibility" querying system that is configured to access analysis data formed as a result of many accessibility analyses of various webpages (such a schema is referred to hereinafter as an accessibility schema). A first type of entity defined by this accessibility schema is a content_site type of entity, where portions of data created according to specification of the content_site type of entity can represent different websites.

Defined for the content_site type of entity are relationships to the content_link, content_group, content_page, and content_site_history types of entities. The content_link type of entity may represent links present across any given website. The content_group type of entity may represent a group of webpages within a website. The content_page type of entity may represent individual webpages within a website. And the content_site history may represent a history of content specific to a specific website. Also defined by the accessibility schema is a content_referring_page type of entity and a tag type of entity. These types of entity are common to the QA schema, SEO schema, and the accessibility schema. Types of entities unique to the accessibility schema include an accessibility_rule type of entity, an accessibility_rule_history type of entity, a page_segment type of entity, and an accessibility_rule_match type of entity.

Figure 3A:
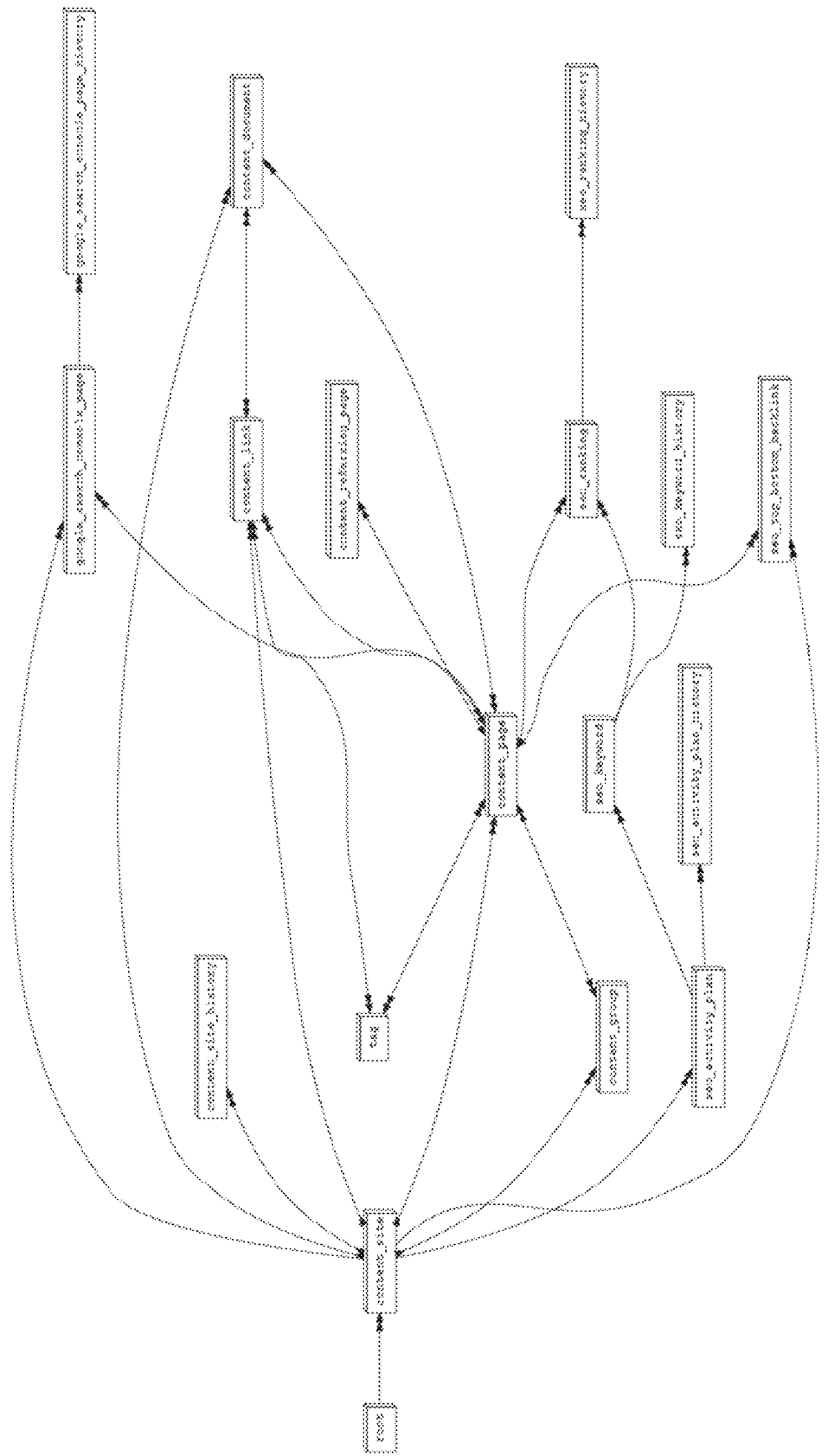
FIG. 3A shows an example composite schema formed from two underlying schemas.

FIG. 3A shows a diagram illustrating entities and relationships of an example composite schema formed from two underlying schemas. For example, the composite schema represented by the diagram in FIG. 3A may have been generated by two underlying schemas for a corresponding two querying system, for example, the QA schema of FIG. 2A and the SEO schema of FIG. 2B. Each entity defined by the two underlying schemas is represented in this diagram, including every relation defined by the two underlying schemas (with full detail on the fields of each type of entity not shown in FIG. 3A). In particular, the composite schema shown in FIG. 3A includes: (1) the types of entities common to the QA and SEO schemas (content_site_history, content_link, content_page, content_group, content_referring_page, and tag), (2) the type of entity unique to the QA schema (content_document), and (3) the type of entities unique to the SEO schema (seo_activity plan, the seo_activity_plan_history, seo_keyword, seo_keyword history, seo_ranking, seo_ranking_history, google_search_console_page, and seo_top_bottom_backlink).

Figure 3B:
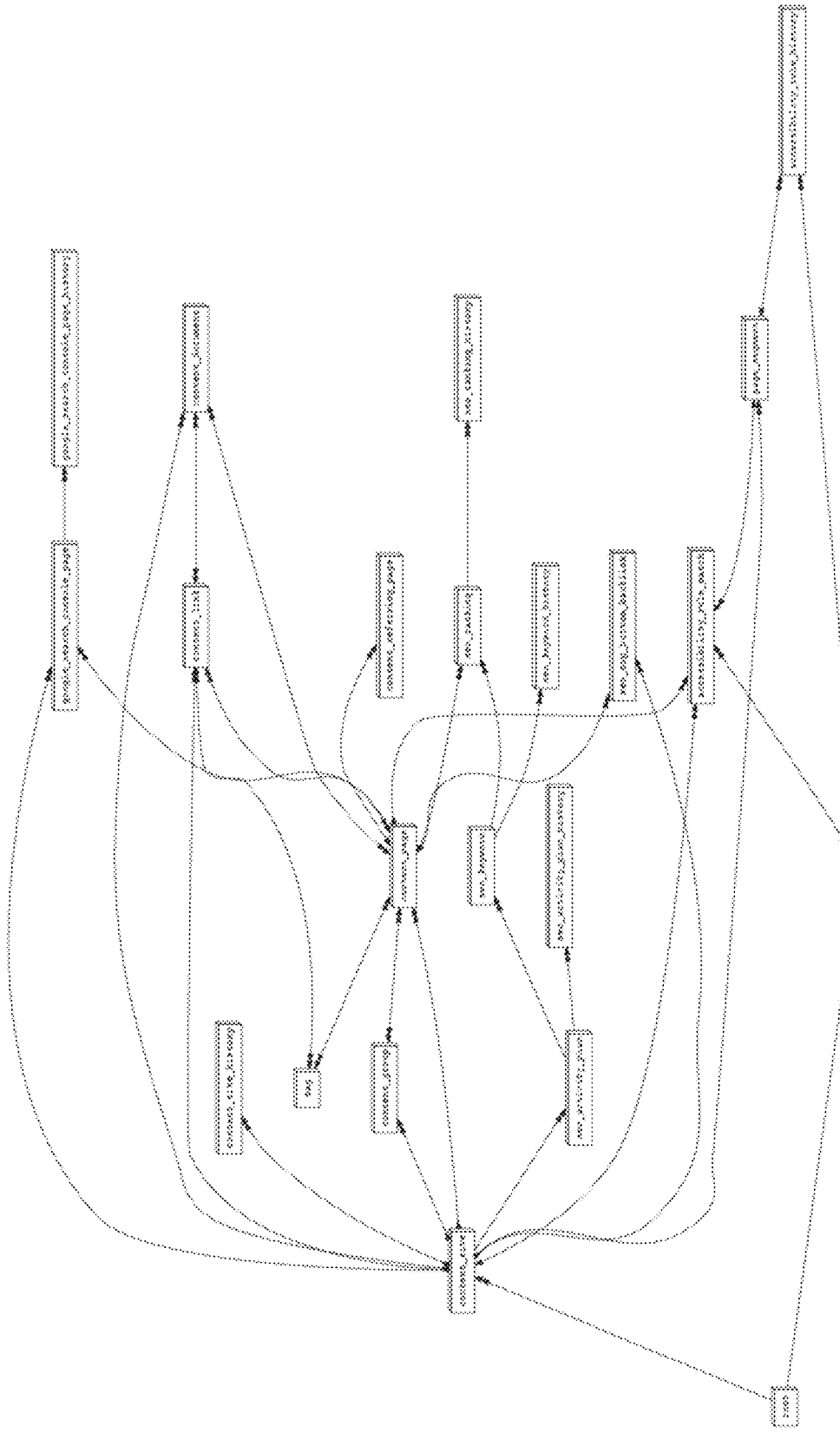
FIG. 3B shows an example composite schema formed from three underlying schemas.

FIG. 3B shows a diagram illustrating entities and relationships of an example composite schema formed from three underlying schemas. For example, the composite schema represented by the diagram in FIG. 3B may have been generated by three underlying schemas for a corresponding three querying systems, for example, the QA schema of FIG. 2A, the SEO schema of FIG. 2B, and the accessibility schema of FIG. 2C. The composite schema of FIG. 3B includes all the types of entities shown in the FIG. 3A composite schema, plus the types of entities unique to the accessibility schema of FIG. 2C (accessibility_rule, accessibility_rule_history, page_segment, and accessibility_rule_match).

Figure 4A:
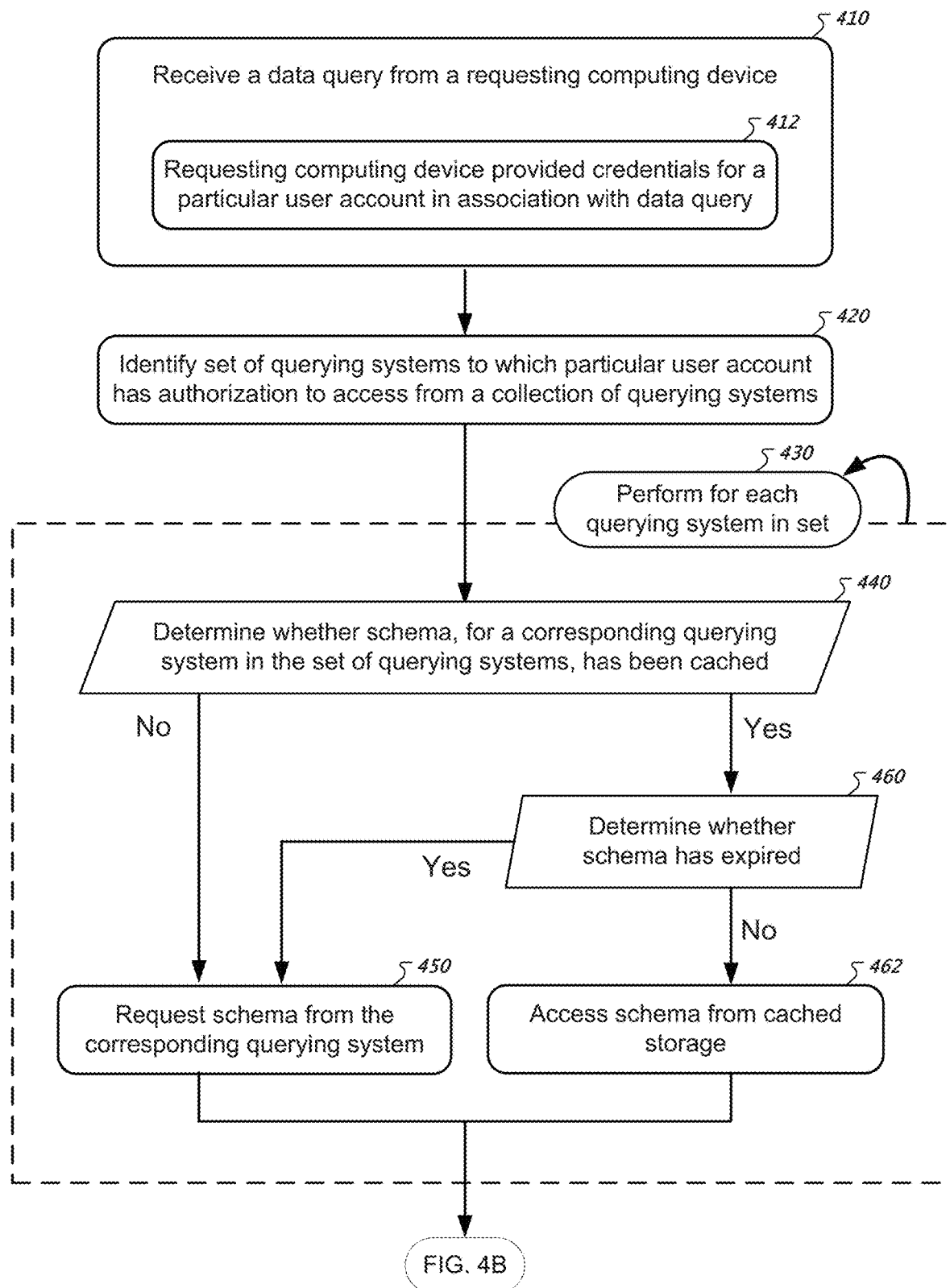

FIGS. 4A-B show a flowchart of a process in which a computing system responds to a query using a composite schema. The process may be performed by one or more components of the system shown in FIG. 1, for example, at least the composite querying system 120.

At box 410, the computing system receives a data query from a requesting computing device. For example, the composite querying system 120 receives a query from the requesting system 110. The query may be specified in SQL and request data regarding multiple types of entities that satisfies certain conditions (e.g., web pages that receive over one thousand views a day, and that have more than ten spelling errors).

At box 412, the requesting computing device provided credentials for a particular user account in association with the data query. In some examples, the data query itself may specify a user account login and password. In some examples, the requesting system 110 may have previously logged into the composite querying system using credentials and the query is submitted while the login session is still active. For example, the composite querying system 120 may identify that all requests received from the requesting system 110 during the login session are specified as being for a particular user account.

At box 420, the computing system identifies a set of querying systems to which the particular user account has authorization to access, from among a collection of querying systems. For example, the composite querying system 120 may be configured to interface with thirteen different querying systems, with FIG. 1 illustrating only three such querying systems for ease of illustration.

Different user accounts, however, may have authorization to access different subsets of the querying systems. For example, the system shown in FIG. 1 may be operated by an organization that analyzes websites for owners of the websites. Each website owner may only be able to access analyses to which the website owner has subscribed. For example, a first website owner may subscribe to a quality analysis module, an SEO module, and an advertisements module and be capable of querying analyses of the first website stored by any such module. A second website owner may also subscribe to the quality analysis module and SEO module, but may not care for analyses generated by the advertisements module and may additionally care about analyses generated by a data privacy module. As such, different user accounts may be identified as having access to different sets of querying systems from among the entire possible collection of querying systems.

The computing system performs the operations of box 430 for each querying system in the identified set of querying systems to which the particular user account has access. In general, the operations of box 430 relate to accessing the schemas for the querying systems in the set of querying systems, either from cached storage or requesting the same from the querying systems themselves.

At box 440, the computing system determines whether a schema for a querying system has been cached. For example, the computing system may determine whether it has stored in local memory a cached copy of a schema previously received from the corresponding querying system.

At box 450, should the schema not be cached, the computing system requests the schema from the corresponding querying system. For example, FIG. 1 illustrates the composite querying system 120 requesting a schema from the first querying system 130 because the schema generator 122 did not have a cached version of this schema in memory.

At box 460, should the computing system determine that the schema is cached, the computing system may determine whether the schema has expired. In some examples, determining whether the schema has expired may include determining whether a certain amount of time has passed since the schema was received from its respective querying system (e.g., ten minutes during which the cached schema is considered unexpired). In some examples, determining whether the schema has spired includes comparing a first timestamp indicating a time of creation of the cached schema to a second timestamp received by the composite querying system 120 from the underlying querying system (e.g., the second querying system 140). The second timestamp may have been generated by the underlying querying system to indicate a time at which a most-recent version of a schema for the underlying querying system was created. So long as the first timestamp is the same as the second timestamp, the computing system may determine that the schema has not expired.

At box 462, should the computing system determine that the schema has not expired, the computing system may access the cached schema from cached storage.

Should the computing system determine that the schema has expired, the computing system may request the schema from the querying system, as described above with respect to box 450.

At box 470, the computing system combines a first schema from a first querying system with a second schema from a second querying system to form a composite schema. For example, the computing system may add schema content from the second schema to the first schema to form the composite schema, or may add schema content from both the first schema and the second schema to a newly-formed schema.

At box 474, the composite schema formed by the computing system includes both components defined by only one schema, and those components defined by more than one schema. For example, the composite schema includes (1) first entity types defined by the first schema and not the second schema; (2) second entity types defined by the second schema and not the first schema; and (3) common entity types defined by both the first schema and the second schema. The composite schema may be considered a union of entity types defined by the underlying schemas, with every entity type from the underlying schemas defined in the composite schema.

The composite schema may similarly include fields and relationships that defined by only one schema, and those defined by multiple such schemas, such that an entity type that is defined by two underlying schemas but that includes a different set of fields and relationships for each underlying schema, is represented in the composite schema by a single entity type with all of the fields and relationships specified by the underlying schemas (e.g., a union of the fields and relationships specified by the underlying schemas).

Each component in the composite schema (e.g., each type of entity, type of field, and type of relationship) is identified as being accessible via one or more underlying querying systems. In other words, those components in the composite schema that are defined in multiple underlying schemas will include references to the multiple corresponding querying systems, because the data can be obtained by via a request to any of the multiple corresponding querying systems.

Box 470 is described with respect to only two querying systems for ease of description, but the composite schema would be created from the same number of underlying schemas as querying systems to which the user account has access.

At box 480, the computing system executes the data query using the composite schema. For example, the query handler 124 executes the query received from the requesting system 110.

At box 482, executing the data query includes determining which selected one or more querying systems a subquery should be sent to. For example, the computing system may transform the received query into one or more subqueries directed to one or more corresponding underlying querying systems. The operations of box 482 are described in additional detail with respect to FIG. 5.

At box 484, the computing system aggregates one or more responses to the one or more subqueries. For example, where a first subquery requested a certain set of rows from a first table and a second subquery requested a particular set of rows from a second table, the computing system may identify which rows from the first table include values that match rows from the second table present such matching rows in a results table. As such, the computing system may perform various query operations on data received in response to subqueries to generate a dataset that is more than a mere combination of the subquery responses.

At box 490, the computing system sends the aggregated response to the query to the requesting computing device. For example, the composite querying system 120 sends the query results to the requesting system 110, as illustrated in FIG. 1 by Stage (8). As such, the requesting system 110 may send a single query to the composite querying system 120 and receive a single response thereto, where such a query was not previously capable of being processed by any of the underlying querying systems 130, 140, and 150.

Figure 5:
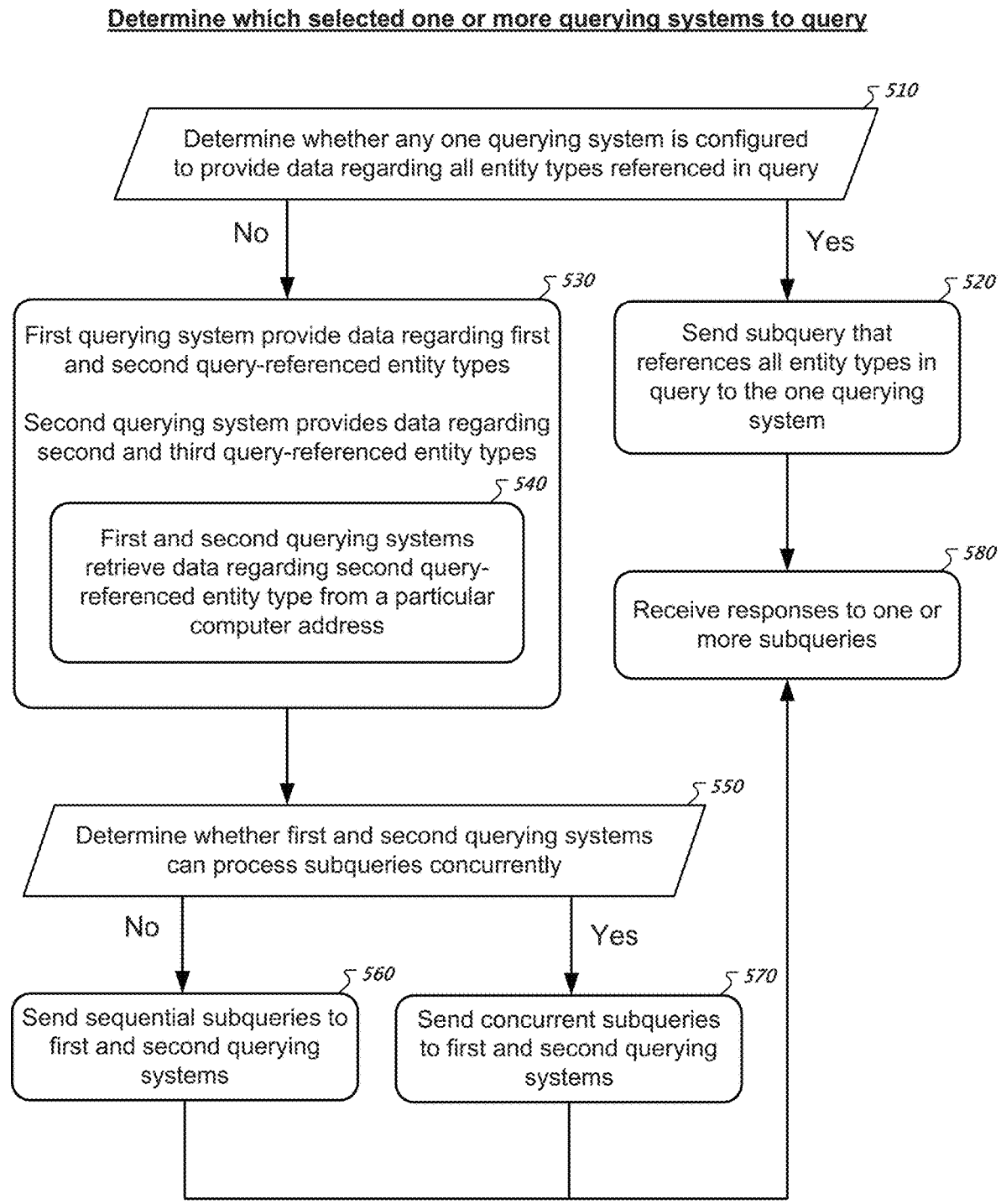
FIG. 5 shows a flowchart of a process for determining which selected one or more querying systems to query.

FIG. 5 shows a flowchart of a process for determining which selected one or more querying systems to query. The FIG. 5 flowchart may provide additional detail regarding the operations of box 482 in FIG. 4.

At box 510, the computing system determines whether any one querying system is configured to provide data regarding all entity types referenced in the query. For example the computing system may (1) identify the various different types of fields referenced in the query, and (2) access stored information that indicates which types of fields are accessible via each querying system, and (3) determine whether any single querying system provides access to all the different types of fields referenced in the query. As such, should the query reference the entity types "content_site", "content_page", and "content_link", the computing system may determine that the quality assurance querying system is able to provide data regarding all such entity types (as illustrated by the FIG. 2A diagram).

At box 520, should the computing system determine that a single querying system is configured to provide data regarding all entity types referenced in the query, the computing system sends a single subquery that references all such entity types to the single querying system. The query may maintain a same form from when received from the remote system to which provided to the underlying querying system, or the computing system may reformat the query into a form defined by requirements of the underlying querying system.

At box 580, the computing system receives responses to any subqueries sent to underlying querying systems, in the above example to the single subquery.

At box 530, should the computing system determine that multiple querying systems are required to provide data regarding the entity types referenced in the query, the computing system may identify a smallest group of querying systems that can provide data regarding all the entity types in the query. In some examples, the query may reference three different entity types and a minimum of two querying systems are needed to provide data on all such entity types. For example, a first querying system may be able to provide data regarding a first entity type referenced in the query and a second entity type referenced in the query, while a second querying system may be able to provide data regarding the second entity type referenced in the query and a third entity type referenced in the query. In other examples, three or more querying systems are needed to provide all the data specified in the query.

Although this description references entity types specified in queries, the computing system also takes into account all types of components that a query can reference and that are defined by the composite schema, including types of entities, types of fields in entities, and types of relationships between the entities. The overall processing is similar, trying to minimize a number of querying systems needed to gather data specified by the query.

At box 540, both of first and second querying systems are configured to retrieve data regarding a same entity type referenced in a query from a particular computer address. For example, FIG. 1 illustrates how both the first querying system 130 and the second querying system 140 are configured to provide access to "B" entity types. The underlying data for such B entity types may be provided by a common portion of the data sources 190. In other words, multiple querying systems may access the same actual data, rather than accessing different, replicated instances of data.

At box 550, having determined that the computing system has to send a first subquery to the first querying system and a second subquery to the second querying system, the computing system determines whether the first and second querying systems can process the subqueries simultaneously. For example, should the computing system determine that the query is structured so that results from the first subquery are needed in order to form the second subquery, the computing system may designate that the first and second subqueries cannot be processed concurrently, and therefore must be processed sequentially.

At box 560, as result of determining that the first and second subqueries cannot be processed concurrently, and therefore must be processed sequentially, the computing system sends sequential subqueries to the first and second querying systems. For example, the computing system may wait until a response to the first subquery is received before sending the second subquery.

There are at least three cases for sequential queries. A first case is due to synthesized relations (e.g., relations that are not part of the incoming schemas, but that are generated based on join keys). A second case is if relations are followed that are not present in individual schemas and two schemas are needed to follow the relations and fulfil the original query. A third case is due to optimization, for example, when there is a selective filter and two or more querying systems are needed to fulfil the query, the original query can be turned into a selective join.

At box 570, as a result of determining that the first and second subqueries can be processed concurrently, the computing system sends concurrent subqueries to the first and second querying systems. For example, the computing system may send both subqueries without waiting for a response to either.

At box 580, the computing system receives responses to the multiple subqueries.

Figure 6A:
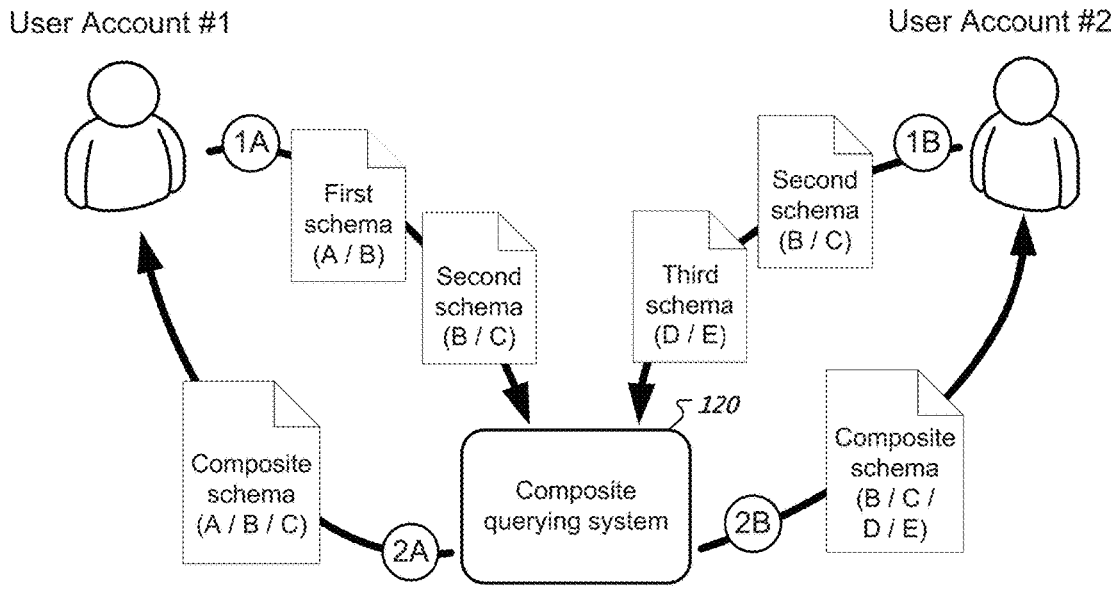
FIG. 6A shows a diagram that illustrates a system generating different composite schemas for different user accounts.

FIG. 6A shows a diagram that illustrates a system generating different composite schemas for different user accounts. This diagram illustrates how two different user accounts may be authorized to access different sets of querying systems, and therefore how the composite querying system 120 may utilize different sets of schemas to build composite schemas for the two different user accounts.

For example, the composite schema for user account #1 is illustrated in FIG. 6A as formed based on a union of a first schema (providing access to entity types A and B) and a second schema (providing access to entity types B and C). As such, the composite schema generated by the composite querying system 120 for user account #1 provides access to entity types A, B, and C. The composite schema for user account #2 is illustrated as being formed based on a union of two different schemas—the second schema (providing access to entity types B and C) and a third schema (providing access to entity types D and E). As such, the composite schema generated for user account #2 provides access to entity types B, C, D, and E.

Figure 6B:
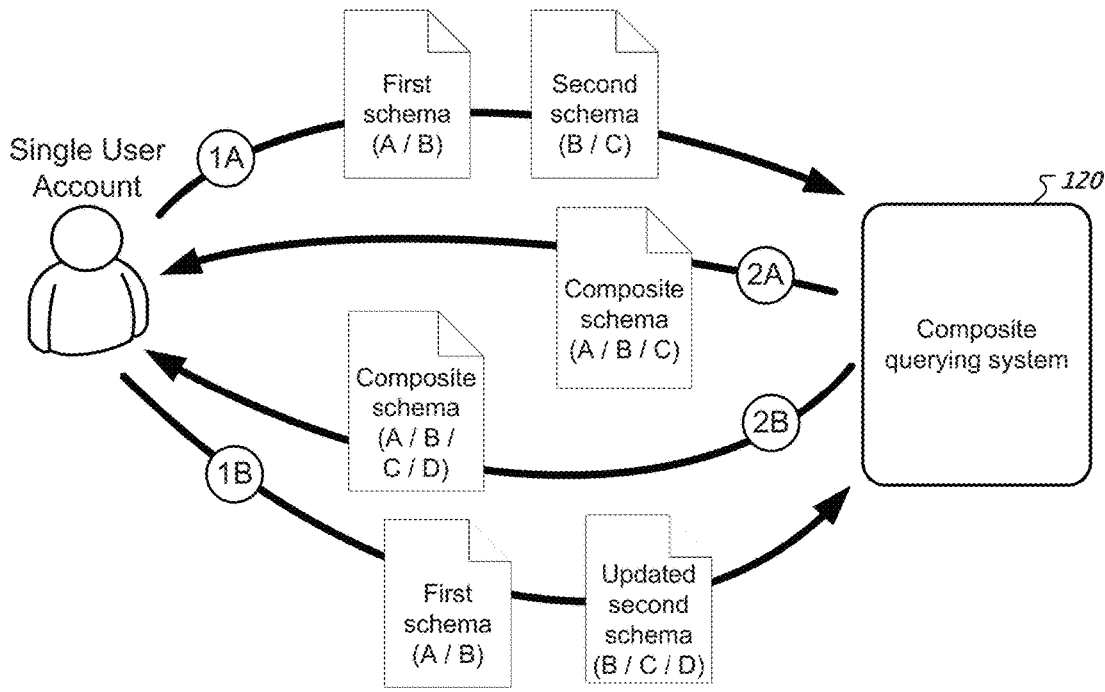
FIG. 6B shows a diagram that illustrates a system generating different composite schemas for the same user account, due to a schema updating.

FIG. 6B shows a diagram that illustrates a system generating different composite schemas for the same user account, due to a schema updating. This figure illustrates how, at a first point in time, the composite querying system 120 may generate a composite schema based on a union of a first schema (providing access to entity types A and B) and a second schema (providing access to entity types B and C). As such, at the first point in time, the composite schema may provide access to entity types A, B, and C. Then, at a second point in time after the second schema has updated to also provide access to entity type D due to the second querying system being extended to provide access to an additional entity type, the composite querying system 120 may generate a different composite schema (providing access to entity types A, B, C, and D) based on schemas provided by the same querying system.

Figure 7:
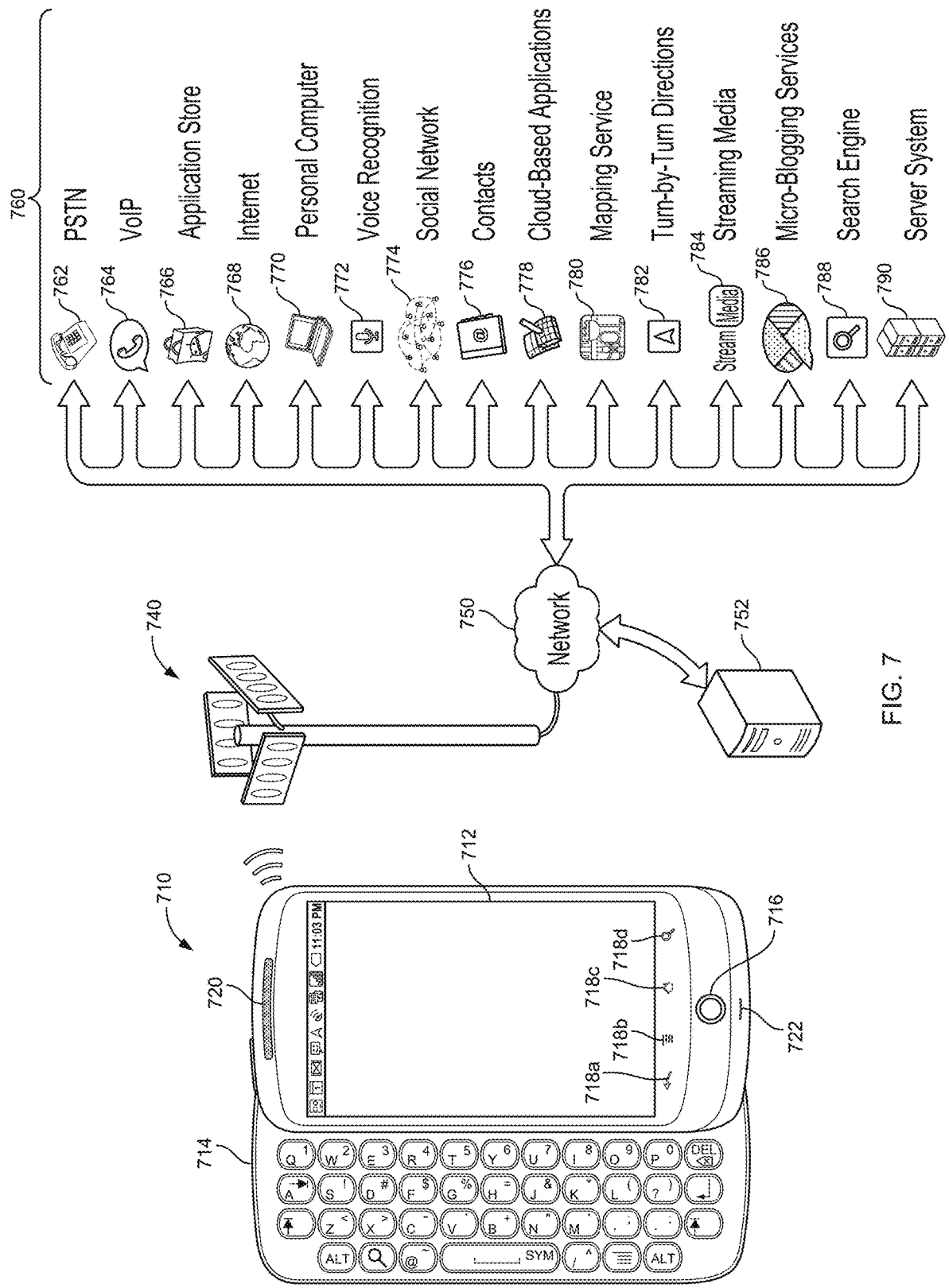
FIG. 7 is a conceptual diagram of a system that may be used to implement the systems and methods described in this document.

Referring now to FIG. 7, a conceptual diagram of a system that may be used to implement the systems and methods described in this document is illustrated. In the system, mobile computing device 710 can wirelessly communicate with base station 740, which can provide the mobile computing device wireless access to numerous hosted services 760 through a network 750.

In this illustration, the mobile computing device 710 is depicted as a handheld mobile telephone (e.g., a smartphone, or an application telephone) that includes a touchscreen display device 712 for presenting content to a user of the mobile computing device 710 and receiving touch-based user inputs and/or presence-sensitive user input (e.g., as detected over a surface of the computing device using radar detectors mounted in the mobile computing device 510). Other visual, tactile, and auditory output components may also be provided (e.g., LED lights, a vibrating mechanism for tactile output, or a speaker for providing tonal, voice-generated, or recorded output), as may various different input components (e.g., keyboard 714, physical buttons, trackballs, accelerometers, gyroscopes, and magnetometers).

Example visual output mechanism in the form of display device 712 may take the form of a display with resistive or capacitive touch capabilities. The display device may be for displaying video, graphics, images, and text, and for coordinating user touch input locations with the location of displayed information so that the device 710 can associate user contact at a location of a displayed item with the item. The mobile computing device 710 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 714, which may be a full qwerty keyboard or a traditional keypad that includes keys for the digits '0-9', '*', and '#.' The keyboard 714 receives input when a user physically contacts or depresses a keyboard key. User manipulation of a trackball 716 or interaction with a track pad enables the user to supply directional and rate of movement information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718*a-d*. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 714. User-selection of the button may invoke the pre-defined action.

In some examples, the operating system provides a "desktop" graphical user interface that is displayed after turning on the mobile computing device 710, after activating the mobile computing device 710 from a sleep state, after "unlocking" the mobile computing device 710, or after receiving user-selection of the "home" button 718c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 710 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 710 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 710 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 710. The mobile computing device 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., ETHERNET, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computing systems that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing systems associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call using a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers. An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user-input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 8:
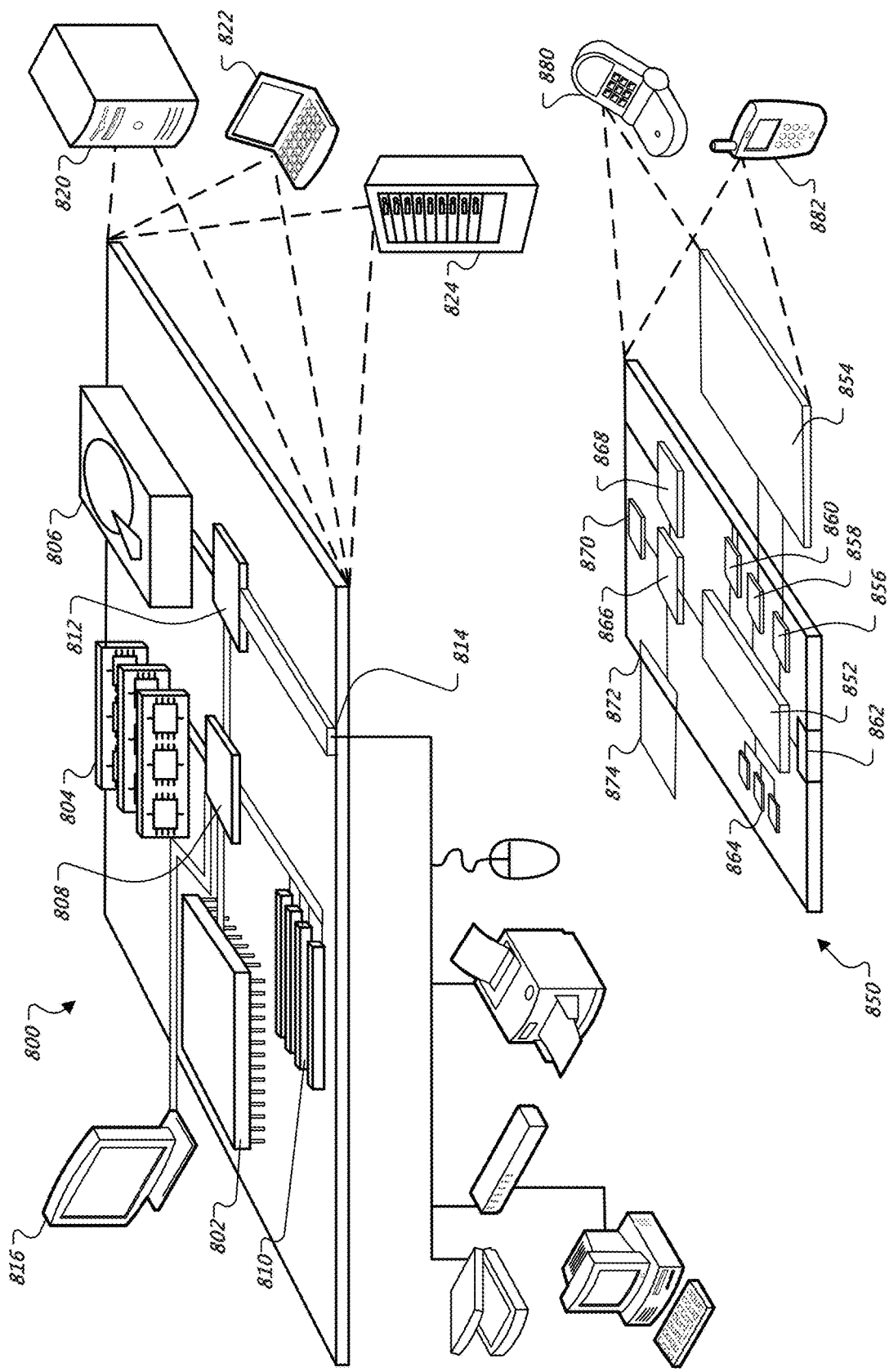
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 800 includes a processor 802, memory 804, a storage device 806, a high-speed controller 808 connecting to memory 804 and high-speed expansion ports 810, and a low speed controller 812 connecting to low speed expansion port 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed controller 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provided, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   receiving, by a computing system, a data query from a requesting computing device, the requesting computing device having provided to the computing system credentials for a particular user account in association with submission of the data query to the computing system, the computing system configured to request data from a set of querying systems that includes a first querying system and a second querying system;
   combining, by the computing system, a first schema that was provided by the first querying system and that defines a first collection of entity types queryable using the first querying system with a second schema that was provided by the second querying system and that defines a second collection of entity types queryable using the second querying system to form a composite schema that includes:
   (i) first entity types that are from the first collection of entity types and that are defined by the first schema and not the second schema, the first entity types referencing the first querying system as being configured to provide data regarding the first entity types;

(ii) second entity types that are from the second collection of entity types and that are defined by the second schema and not the first schema, the second entity types referencing the second querying system as being configured to provide data regarding the second entity types; and (iii) common entity types that are from both the first collection of entity types and the second collection of entity types and that are defined by both the first schema and the second schema, the common entity types referencing both the first querying system and the second querying system as being configured to provide data regarding the common entity types;

executing, by the computing system, the data query using the composite schema in order to determine which selected one or more querying systems in the set of querying systems to query in response to receiving the data query; and sending, by the computing system to the requesting computing device responsive to receiving the data query from the requesting computing device, a response to the query, the response to the query being based on information received from the selected one or more querying systems.

2. The computer-implemented method of claim 1, wherein the computing system combines the first schema and the second schema to form the composite schema responsive to the computing system receiving the data query.

3. The computer-implemented method of claim 1, comprising:

identifying, by the computing system, the set of querying systems as being a subset of querying system to which the particular user account has authorization to access from among a collection of querying systems, such that the particular user account does not have authorization to access at least one querying system from the collection of querying systems.

4. The computer-implemented method of claim 3, comprising:

receiving, by the computing system, a second data query from a second requesting computing device, the second requesting computing device having provided to the computing system credentials for a second user account in association with submission of the second data query to the computing system;

identifying, by the computing system, that the second user account has authorization to access a second set of computing systems from among the collection of querying systems, the second set of querying systems including the first querying system and a third querying system but excluding the second querying system, wherein the set of querying systems to which the first user account has authorization to access excludes the third querying system;

combining, by the computing system, the first schema with a third schema that was provided by the third querying system and that defines a third collection of entity types queryable using the third querying system to form a second composite schema that includes:

(i) second-first entity types that are from the first collection of entity types and that are defined by the first schema and not the third schema, the second-first entity types referencing the first querying system as being configured to provide data regarding the second-first entity types;

(ii) third entity types that are from the third collection of entity types and that are defined by the third schema and not the first schema, the third entity types referencing the third querying system as being configured to provide data regarding the third entity types; and (iii) second-common entity types that are from both the first collection of entity types and the third collection of entity types and that are defined by both the first schema and the third schema, the second-common entity types referencing both the first querying system and the third querying system as being configured to provide data regarding the second-common entity types, wherein the composite schema excludes entity types that are defined by the third schema and not the first schema and not the second schema, wherein the second composite schema excludes entity types that are defined by the second schema and not the first schema and not the third schema;

executing, by the computing system, the second data query using the second composite schema in order to determine which second-selected one or more querying systems in the second set of querying system to employ in responding to the second data query; and sending, by the computing system to the second requesting computing device responsive to having received the second data query from the second requesting computing device, a second response to the second query, the second response to the second query being based on information received from the second-selected one or more querying systems.

5. The computer-implemented method of claim 1, comprising:

receiving, by the computing system, a second data query from the requesting computing device, after the second querying system has updated from the second schema to an updated second schema that defines an updated second collection of entity types queryable using the second querying system, the updated second collection of entity types being different from the second collection of entity types;

combining, by the computing system, the first schema that was provided by the first querying system with the updated second schema that was provided by the second querying system to form an updated composite schema that includes:

(i) second-first entity types that are from the first collection of entity types and that are defined by the first schema and not the updated second schema, the second-first entity types referencing the first querying system as being configured to provide data regarding the second-first entity types;

(ii) updated second entity types that are from the second collection of entity types and that are defined by the updated second schema and not the first schema, the updated second entity types referencing the second querying system as being configured to provide data regarding the updated second entity types, wherein the updated second entity types in the updated composite schema includes an entity type defined by the updated second schema and not the second schema; and (iii) updated common entity types that are from both the first collection of entity types and the updated second collection of entity types and that are defined by both the first schema and the updated second schema, the updated common entity types referencing both the first querying system and the second querying system as being configured to provide data regarding the updated common entity types, wherein the updated common entity types in the updated composite schema include an entity type defined by the updated second schema and not the second schema;

executing, by the computing system, the second data query using the updated composite schema in order to determine which second-selected one or more querying systems in the set of querying system to employ in responding to the second data query; and sending, by the computing system to the remote computing device responsive to having received the second data query from the remote computing device, a second response to the second query based on information received from the second-selected one or more data querying systems.

6. The computer-implemented method of claim 5, wherein the second data query is same as the first data query.

7. The computer-implemented method of claim 1, wherein:

the data query references a first query-referenced entity type, a second query-referenced entity type, and a third query-referenced entity type;

determining which selected one or more querying systems in the set of querying systems to query in responding to the data query includes determining, by the computing system, whether any one querying system in the set of querying systems is configured to provide data regarding all of the first query-referenced entity type, the second query-referenced entity type, and the third query-referenced entity type; and the method comprises sending, by the computing system, a subquery that references the first query-referenced entity type, the second query-referenced entity type, and the third query-referenced entity type to the first querying system, responsive to determining that the first querying system is configured to provide data regarding all of the first query-referenced entity type, the second query-referenced entity type, and the third query-referenced entity type, such that the first querying system is the selected one or more data querying systems.

8. The computer-implemented method of claim 1, wherein:

the data query references a first query-referenced entity type, a second query-referenced entity type, and a third query-referenced entity type;

determining which selected one or more querying systems in the set of querying systems to employ in responding to the data query includes:

determining, by the computing system as a result of a determination regarding whether any one querying system in the set of querying systems is configured to provide data regarding all of the first query-referenced entity type, the second query-referenced entity type, and the third query-referenced entity type, that:

(i) no querying system in the set of querying systems is configured to provide data regarding all of the first query-referenced entity type, the second query-referenced entity type, and the third query-referenced entity type;

(ii) the first querying system is configured to provide data regarding the first query-referenced entity type and the second entity type but not the third query-referenced entity type, and (iii) the second querying system is configured to provide data regarding the second query-referenced entity type and the third query-referenced entity type but not the first query-referenced entity type;

determining, by the computing system, whether the first querying system is capable of processing a first sub-query to provide data regarding the first query-referenced entity type and the second query-referenced entity type concurrently with the second querying system processing a second sub-query to provide data regarding the third query-referenced entity type;

the method comprises:

sending, by the computing system, the first sub-query to the first querying system and the second sub-query to the second querying system concurrently before a response to either such sub-query has been received by the computing system, responsive to determining that the first querying system is capable of processing the first sub-query concurrently with the second querying system processing the second sub-sub-query; and aggregating, by the computing system, a first response to the first sub-query that is provided by the first querying system with a second response to the second sub-query that is provided by the second querying system, to form a single composite query response; and the response to the query that is sent from the computing system to the requesting computing device comprises the single composite query response, the response to the query including data regarding the first query-referenced entity type, the second query-referenced entity type, and the third query-referenced entity type despite no querying system in the set of querying systems being configured to provide data regarding all such query referenced entity types.

9. The computer-implemented method of claim 8, wherein:

the first querying system is configured to retrieve data regarding the first query-referenced entity type from a particular computer address in computer storage; and the second querying system is configured to retrieve data regarding the first query-referenced entity type from the particular computer address in the computer storage.

10. The computer-implemented method of claim 8, wherein the computing system is configured, in response to determining that the first querying system is capable of processing the first sub-query concurrently with the second querying system processing the second sub-subquery, to send the first sub-query to the first querying system and wait to send the second sub-query to the second querying system until the computing system has received a response to the first sub-query.

11. The computer-implemented method of claim 1, comprising:

requesting, by the computing system responsive to receiving the data query, the first schema from the first querying system.

12. The computer-implemented method of claim 11, wherein:

the computing system requests the first schema from the first querying system responsive to determining that the computing system has not cached the first schema; and the method comprises determining, by the computing system, that the computing system has cached the second schema in cached storage, and in response accessing the second schema from the cached storage for use in the combining of the first schema and the second schema.

13. The computer-implemented method of claim 12, wherein:
the method comprises determining that the second schema stored in the cached storage has not expired;
the computing system uses the second schema from the cached storage in response to determining that the second schema from the cached storage has not expired; and
the computing system is configured to request the second schema from the second querying system despite the second schema being stored in the cached storage responsive to determining that the second schema has expired.

14. The computer-implemented method of claim 13, wherein:
determining whether the second schema stored in the cached storage has expired includes comparing a timestamp stored in association with the second schema stored in the cached storage to a timestamp stored by the second querying system.

15. A computing system, comprising:
one or more processors; and
one or more computer-readable devices including instructions that, when executed by the one or more processors, cause the computing system to perform operations that include:
receiving, by the computing system, a data query from a requesting computing device, the requesting computing device having provided to the computing system credentials for a particular user account in association with submission of the data query to the computing system, the computing system configured to request data from a set of querying systems that includes a first querying system and a second querying system;
combining, by the computing system, a first schema that was provided by the first querying system and that defines a first collection of entity types queryable using the first querying system with a second schema that was provided by the second querying system and that defines a second collection of entity types queryable using the second querying system to form a composite schema that includes:
(i) first entity types that are from the first collection of entity types and that are defined by the first schema and not the second schema, the first entity types referencing the first querying system as being configured to provide data regarding the first entity types;
(ii) second entity types that are from the second collection of entity types and that are defined by the second schema and not the first schema, the second entity types referencing the second querying system as being configured to provide data regarding the second entity types; and
(iii) common entity types that are from both the first collection of entity types and the second collection of entity types and that are defined by both the first schema and the second schema, the common entity types referencing both the first querying system and the second querying system as being configured to provide data regarding the common entity types;
executing, by the computing system, the data query using the composite schema in order to determine which selected one or more querying systems in the set of querying systems to query in response to receiving the data query; and
sending, by the computing system to the requesting computing device responsive to receiving the data query from the requesting computing device, a response to the query, the response to the query being based on information received from the selected one or more querying systems.

* * * * *